Dec. 23, 1952   A. E. RAMCLOW   2,622,792
COMPRESSOR INTAKE VALVE
Filed March 8, 1946

Inventor:
Axel E. Ramclow
By: Carl H. Lloyd
Attorney

Patented Dec. 23, 1952

2,622,792

UNITED STATES PATENT OFFICE 2,622,792

COMPRESSOR INTAKE VALVE

Axel E. Ramclow, Chicago, Ill., assignor to Mills Industries, Incorporated, Chicago, Ill., a corporation of Illinois Application March 8, 1946, Serial No. 653,201

1 Claim. (Cl. 230—221)

This invention relates to fluid compressors such as are used in the compressor-condenser type of refrigeration system and its purpose is to provide an improved combination unloader and suction valve construction for such compressors.

The object of the invention is to provide a valve construction of this character in which a flat valve disc is so related to a specially constructed piston head that the valve is normally open and in which the disc is protected against the danger of distortion or breakage in flexing to and from the closed position.

The advantages of the improved construction will be apparent from the following description, taken in connection with the accompanying drawings, in which.

Figure 1:
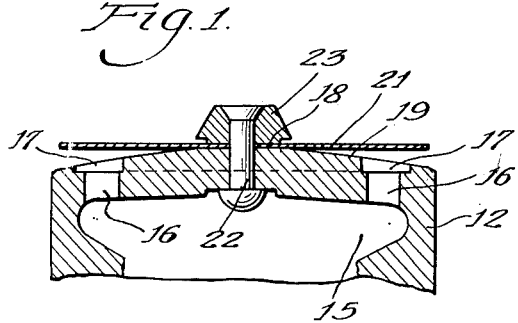
Fig. 1 is a cross sectional view of the outer portion of a piston upon which the valve construction of my invention is employed.

In said drawings I have illustrated diagrammatically a compressor cylinder 11 in which a piston 12 is mounted for reciprocating motion imparted from a crank shaft (not shown) through a connecting rod 13 to which the piston is connected by means of the usual wrist pin 14.

The piston is of hollow construction so that gas from the crank case (not shown) may fill the cavity 15 in said piston and be drawn through valve openings 16 in the piston head, there being in the construction shown four of such openings spaced circumferentially around the center of the head. A circular channel 17 is formed on the outer face of the head and said openings 16 open into said channel.

In accordance with my invention the piston head has a relatively small flat central portion 18 and the remainder of the face is of slightly convex or conical form as indicated at 19. As shown in the drawings, the taper of the latter portion of the face is greatly exaggerated for convenience in illustration and it is to be understood that in practice the taper would be very slight so as to provide only a small clearance along the order of say five-thousandths of an inch when the valve disc is in the neutral position shown in Figs. 1 and 2.

Said valve disc, numbered 21 in the drawings, is a normally flat disc and is clamped to the flat portion 18 of the piston head by means of a rivet 22 and washer 23.

The cylinder 11 has a discharge opening 24 therein and the discharge of compressed gas through this opening is controlled by means of a discharge valve of any suitable construction, such valve not being illustrated in the drawings since it forms no part of the present invention.

Figure 2:
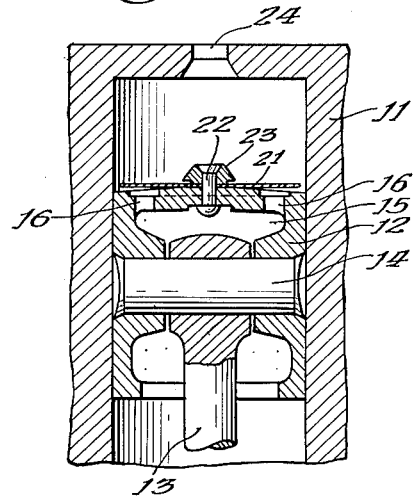
Fig. 2 is a cross-sectional view of a compressor cylinder and piston with the valve disc shown in a neutral or stationary position.

It will now be apparent that when the valve disc is in its stationary or neutral position, illustrated in Figs. 1 and 2, the valve will be open, that is, the channel 17 will be uncovered slightly by reason of the frusto-conical form of the piston head.

There are certain advantages in intake valve constructions in which the valve disc is unseated in its neutral or stationary position, these being set forth at some length in Patents Numbers 2,106,775 and 2,246,868 which were issued to the applicant's assignee. They will not be repeated in detail here, it being sufficient to say that increased efficiency is obtained by permitting the gas to flow into the compression chamber after the neutral position of the valve disc has been reached and causing the valve disc to become seated at the point in the compression stroke at which no gas tends to flow through the valve openings. Whether the construction be such as to provide for operation in this manner or to cause the seating of the valve disc by the combined effect of inertia and fluid resistance, greater efficiency is obtained than with valve constructions in which the valve disc is seated in its normal position of rest.

The first of the two patents above mentioned undertook to provide the normally open relationship by the use of a pre-dished valve disc, the peripheral portions of which are curved away from the valve openings. This type of construction involves difficulties in manufacture and in operation which are quite serious since it is difficult to form the valve discs with sufficient accuracy to obtain efficient results.

In the second patent to which I have referred a flat valve disc is employed which is spaced away from the piston head by means of a washer or other spacing means and is adapted to be flexed upon the compression stroke to cause its peripheral portions to seat against a trunco-conical rim of the piston head. This construction has been found to overcome the manufacturing difficulties above mentioned and to be reasonably satisfactory in practice but it is subject to the difficulty that there is a tendency for the valve discs to fracture on the edge of the spacing washer or to become so distorted as to impair the efficiency of the operation of the compressor. It will be understood that such compressors operate at very high speed and that the intake valve disc is subject to considerable pressure and rapid changes of position which may cause the breakage or distortion above mentioned.

Figure 3:
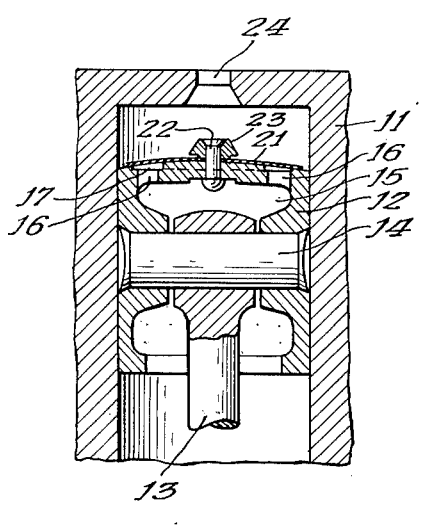
Fig. 3 is a similar view showing the valve disc in the position which it assumes during the compression stroke of the piston.
Figure 4:
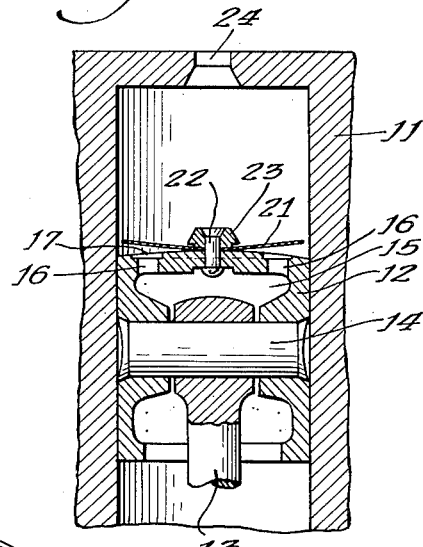
Fig. 4 is a like view with the valve disc shown in the position which it assumes during the suction stroke of the piston.
Figure 5:
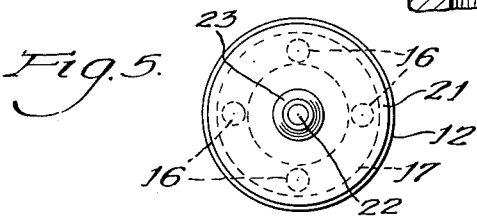
Fig. 5 is a plan view of the piston head with the valve disc positioned thereon.

The present invention is in the nature of an improvement upon the construction of said Patent 2,246,868. While employing a flat valve disc, which may be easily and cheaply manufactured, the danger of breakage or distortion of the disc, which exists with the construction in said patent, is avoided by so constructing the piston head that there is no undue strain upon the disc. The central portion of the disc is clamped against the relatively small, flat, central portion 18 of the piston head and when it is flexed in moving to closing position the outer portion thereof conforms to the contour of the convex or conical portion 19 of the head which has such a gradual slope that there is no tendency to fracture or distort the disc. As will be seen from Fig. 3, the curvature of the disc from the central, flat portion of the piston head to the edge portion of the piston beyond the channel 17 is uniform and gradual and the action of the disc against said head involves no sharp bending at any point. Accordingly the disc retains its original form over a long period of use and the accurate predetermined relationship between the disc and the piston head is maintained indefinitely. In compressors of small dimension and high speed of operation very slight changes in the relationship between the disc and the valve seat can greatly impair the efficiency of operation of the compressor. It has been found in practice that the construction of the present application is at least 15% more efficient from the standpoint of volume of gas compressed in a given period of time than either of the prior constructions above mentioned and has even greater superiority over any other comparable construction of which I am aware. It therefore accomplishes a decided improvement in the art.

The foregoing detailed description has been given for clearness of understanding only, and no unnecessary limitations should be understood therefrom, but the appended claim should be construed as broadly as permissible in view of the prior art.

I claim:

In a fluid compressor, in combination, a cylinder, a reciprocable piston in said cylinder having in its head a valve seat of annular shape, and a normally flat valve disc of thin, resilient metal, the central region of said head being flat and the central portion of said disc being rigidly secured to said flat portion of the head, said head sloping gradually outwardly from said central flat portion and having valve openings in the outer part thereof adapted to be closed by said disc when the same is flexed to conform to the contour of said head, the dimensions and flexibility of said valve disc being so coordinated with respect to its normal spacing from said valve seat and with respect to the speed of reciprocation that said disc will assume a convex shape and make closing contact with said seat under the effect of inertia on the compression stroke of the piston and will lag in closing until a maximum amount of fluid has been drawn into the compression chamber of the cylinder.

AXEL E. RAMCLOW.

REFERENCES CITED

The following references are of record in the file of this patent:

UNITED STATES PATENTS

| Number | Name | Date |
|---|---|---|
| 2,065,062 | Dugelay | Dec. 22, 1936 |
| 2,089,630 | Teeter | Aug. 10, 1937 |
| 2,106,775 | Trask | Feb. 1, 1938 |
| 2,142,712 | Brant | Jan. 3, 1939 |
| 2,158,351 | Ames et al. | May 16, 1939 |